United States Patent
Olson et al.

[11] Patent Number: 5,513,895
[45] Date of Patent: May 7, 1996

[54] ADJUSTABLE BICYCLE SEAT ASSEMBLY WITH A SLIDING SEAT MOUNT

[75] Inventors: Gary M. Olson, Ashville; Gary Evans, Frewsburg; Wallace L. Thompson, Lakewood, all of N.Y.

[73] Assignee: Flat Back Technologies, Inc., Ashville, N.Y.

[21] Appl. No.: 87,285

[22] Filed: Jul. 8, 1993

Related U.S. Application Data

[63] Continuation-in-part of Ser. No. 985,146, Dec. 3, 1992.

[51] Int. Cl.⁶ ........................................................ B62J 1/00
[52] U.S. Cl. ............................... 297/215.14; 297/215.13; 297/215.15
[58] Field of Search ............................. 297/195.1, 215.1, 297/215.13, 215.14, 215.15, 203

[56] References Cited

U.S. PATENT DOCUMENTS

| 807,749 | 12/1905 | Ledig | 297/203 X |
|---|---|---|---|
| 4,108,462 | 8/1978 | Martin | 297/215.14 X |

FOREIGN PATENT DOCUMENTS

| 2436061 | 4/1980 | France | 297/215.15 |
|---|---|---|---|
| 2585318 | 1/1987 | France | 297/215.15 |
| 2589120 | 4/1987 | France | 297/215.13 |
| 0280469 | 11/1927 | United Kingdom | 297/195.1 |

*Primary Examiner*—Milton Nelson, Jr.
*Attorney, Agent, or Firm*—Larson and Taylor

[57] ABSTRACT

An adjustable seat post assembly for a bicycle includes a movable seat for a rider of the bicycle and an adjustable mounting device for mounting the seat on the bicycle so as to enable the seat to be moved between a first, normal riding position and a second position upwardly and rearwardly of the first position wherein the lumbar spine of a rider sitting on the seat passively assumes a protective curvature. A braking assembly enables the seat to be stopped at any selected position along a linear path of movement between the first and second positions. In one embodiment, a pair of parallel elongate arms are secured to the seat and are movable axially to provide movement of the seat, and a mount through which the arms slide is secured to the bicycle. In another embodiment, the seat is affixed to a sliding block which is received in an elongate slot formed in a body member secured to the bicycle so that the seat can be moved to different positions along the body member under the control of the rider.

21 Claims, 5 Drawing Sheets

ADJUSTABLE BICYCLE SEAT ASSEMBLY WITH A SLIDING SEAT MOUNT

CROSS REFERENCE TO A RELATED APPLICATION

This application is a continuation-in-part of our copending application Ser. No. 07/985,146, filed on Dec. 3, 1992, and entitled "Adjustable Bicycle Seat Assembly."

FIELD OF THE INVENTION

The present invention relates to bicycles and more particularly to a bicycle seat post construction that enables the rider to choose a seat position which places the lumbar spine of the rider at a protective angle, concurrently changing skeletal/kinesiologic function.

BACKGROUND OF THE INVENTION

The leading musculo-skeletal complaint that Americans have is non-specific low back pain. Studies regarding the etiology of this pain (see McKenzie, R. A., *The Lumbar Spine, Mechanical Diagnosis and Therapy*, New Zealand, 1981) suggest that a combination of several conditions may collectively contribute to pain onset. First, the lumbar spine is anatomically strongest with the normal lordotic (extension) curve maintained. Inspection of the lumbar spine reveals the structural components of the vertebral disc are strongest and most reliable on the anterior (front) side of the spine. Secondly, the soft tissue structures which support the lumbar spine are strongest on the anterior side of the spine. When and if pain occurs, this pain is most often associated with soft tissue structures of the lumbar spine. Extension theory suggests that most non-specific low back pain is the result of the cumulative stresses and strains which are placed upon the posterior aspect of the lumbar spine by a lifestyle in which individuals are most often found bending forward (flexion).

According to the work by McKenzie referred to above, the chief contributing factor to the etiology of nonspecific low back pain is sustained flexion strain in the seated position. Obviously, maintenance of the normal protective lordotic curve would be the easiest answer to a great deal of suffering. However, anyone who has tried to actively and consciously maintain this protective curve will attest to the fact that it is virtually impossible to remember to sit correctly all the time.

A further obvious approach to this problem has been to attempt to create sitting environments in which the normal protective lumbar curve is passively maintained. Contemporary examples of passive devices designed for this purpose include special pillows to be placed behind the lower back while sitting, adjustable lumbar support devices installed in automobile seats, knee chairs, chairs with special built-in lumbar support, and the like.

A discussion with any biking enthusiast will reveal that lower back pain is a very common complaint. Sitting is obviously essential to the activity of bicycle riding and the sustained flexion strain placed upon the lower back by the simple act of sitting on a bicycle is significant. In addition, the hazard to lower back health is greatly compounded by the addition stresses created by pedaling.

SUMMARY OF THE INVENTION

In accordance with the invention, a bicycle seat post construction or assembly is provided which creates a passive lumbar support environment for a rider of the associated bicycle. Although with the bicycle seat construction of the invention the seat position can be readily adjusted to any location along an inclined sliding plane, at least two fundamental positions are featured. One of these, the normal or forward position, is essentially the normal seat position commonly provided on standard bicycles. Another of these, the lumbar or rearward position, passively places the lumbar spine of the rider into the protective lordotic curve, i.e., passively causes the lumbar spine to assume a protective lordotic curvature.

In accordance with one embodiment, a position selector, preferably located at a forward position of the bicycle with the gears and other controls, permits the cyclist to choose, at will, between either the normal position or the lumbar position. A locking or braking mechanism ensures that the seat does not unexpectedly leave any selected position. In addition, a specialized seat post construction ensures that the seat remains in the same relative sitting position whether the seat is in the forward or rearward location.

The lumbar position can be adjusted to accommodate each individual rider, and when properly adjusted, this position significantly reduces or eliminates the sustained flexion strain commonly experienced by many cycling enthusiasts. In this regard, movement to the lumbar position involves simultaneously moving the seated position of the rider upwardly and backwardly, thereby helping to tilt the pelvis into protective lordosis. It is expected that this positioning of the body of the rider will contribute to a corresponding reduction in lower back dysfunction among otherwise healthy riders.

In accordance with a further, preferred embodiment of the invention, an adjustable seat post construction is provided which includes a mount for supporting a movable seat and for providing movement thereof along a path defined by said mount between a first, normal position and at least one further position located upwardly and rearwardly of the normal position. In general, a potentially infinite number of upward (0° to 60°) and rearward (0 to 8 inch) positions can be provided, and although a ball-bearing detent assembly of the type provided in accordance with a preferred embodiment can conveniently provide as many as about thirteen seat positions, other implementations can significantly increase the available choices. As with the embodiment discussed above, the upward and backward movement of the seat increases hip flexion, allowing more efficient use of gluteal structures during leg extension. This is advantageous in that the backward position(s) engage the most powerful muscle group in the body. Additionally, the ability of the rider to change positions "at will" gives the rider significantly more flexibility (the single static position of a normally configured seat post design being eliminated). Riders will, as they change seat positions, experience "fresh legs" as the functional anatomical/kinesiologic position of the rider is continually changing. This movement contributes to better lower back health.

Preferably, a seat support assembly secured to the seat includes a base member or sliding block which is received in an elongate slot in the mount so as to permit the seat to slide along the mount between different positions. In a preferred implementation, the sliding block is captured within the slot while being able to slide therealong.

In this embodiment, a braking means is provided in the form of a detent arrangement which releasably retains the seat in said positions. As noted above, the detent arrangement preferably comprises a spring loaded ball bearing received in the sliding block and a series of recesses formed in the bottom of the slot at spaced locations which determine said seat positions. In a preferred embodiment, five positions are provided, although, as stated, this implementation could include as many as thirteen positions. A rearward or forward force exerted in either direction by the rider on the seat will release the detent arrangement to enable movement of the seat from its present position to a new position.

Other features and advantages of the invention will be set forth in, or apparent from, the following detailed description of preferred embodiments of the invention.

DESCRIPTION OF THE PREFERRED EMBODIMENT

Figure 1:
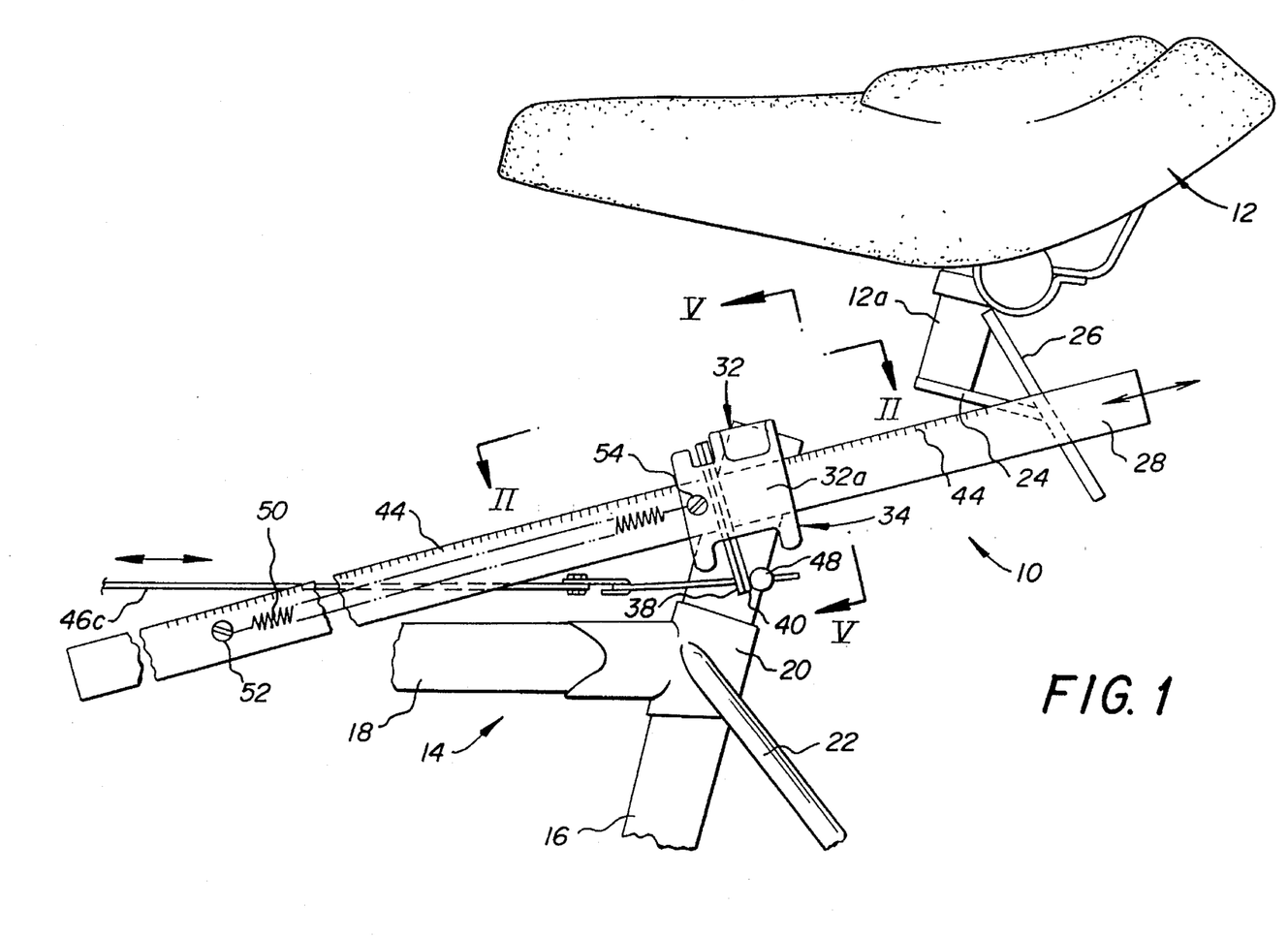
FIG. 1 is a side elevational view of an adjustable bicycle seat assembly constructed in accordance with a preferred embodiment of the invention.

Referring to FIG. 1, an adjustable seat assembly is shown which is generally denoted 10. A conventional bicycle seat is indicated at 12, and a portion of the bicycle frame is shown at 14, this frame including a support post 16, a horizontal bar 18, a connecting bracket 20 and a support strut 22. It will be appreciated that the bicycle construction itself, including the seat 12 per se, is completely conventional, forms no part of the present invention, and can take other forms. Generally speaking, the purpose of the adjustable assembly 10 is to enable movement of seat 12 relative to support post 16 between a normal seat position and a protective lumbar seat position.

Figure 2:
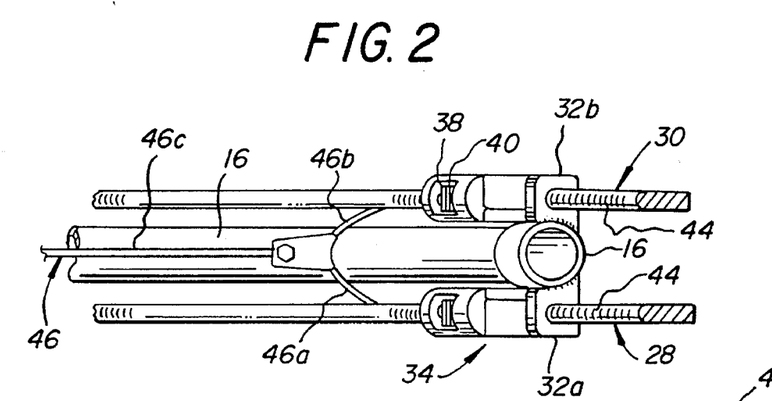
FIG. 2 is a plan view of a detail of the assembly of FIG. 1 taken generally in the direction of line II—II of FIG. 1.

The seat 12, which itself is conventional, is part of a specialized seat assembly including a seat support post 12a welded to a platform member 24 and to a support strut 26 which together form a base for the seat 12. Platform 24 and strut 26 preferably take the form of metal plates and are welded to a pair of seat support arms 28 and 30 (see FIG. 2). In the illustrated embodiment, arms 28 and 30 are elongate, flat sided metal rods or plates.

Arms 28 and 30 slide within the housing 32 of a braking control mechanism or unit generally denoted 34. The housing 32 includes separate, twin parts 32a and 32b (see FIGS. 2 and 5) welded to opposite sides of bicycle support post 16 and each including an axially extending slot 36 therethrough in which a respective one of arms 28 and 30 is received.

A pair of brake plates 38 and 40 is received in each housing part 32a and 32b, plates 38 and 40 being generally rectangular in shape and including aligned rectangular openings 38a and 40a through which seat arms 28 and 30 extend. This can perhaps be best seen in FIGS. 3 and 4 which show openings 38a and 40a in dashed lines and at the left side of FIG. 5, wherein the upper part of plate 40 is indicated in dashed lines and arm 28 is broken away so as to permit viewing of opening 40a through slot 36. The plates 38 and 40 are received in corresponding transverse slots or apertures in housing parts 32a and 32b (see FIGS. 3 and 4) and extend outwardly therefrom on opposite sides as shown, for example, in FIG. 1.

Figures 3, 4, 5:
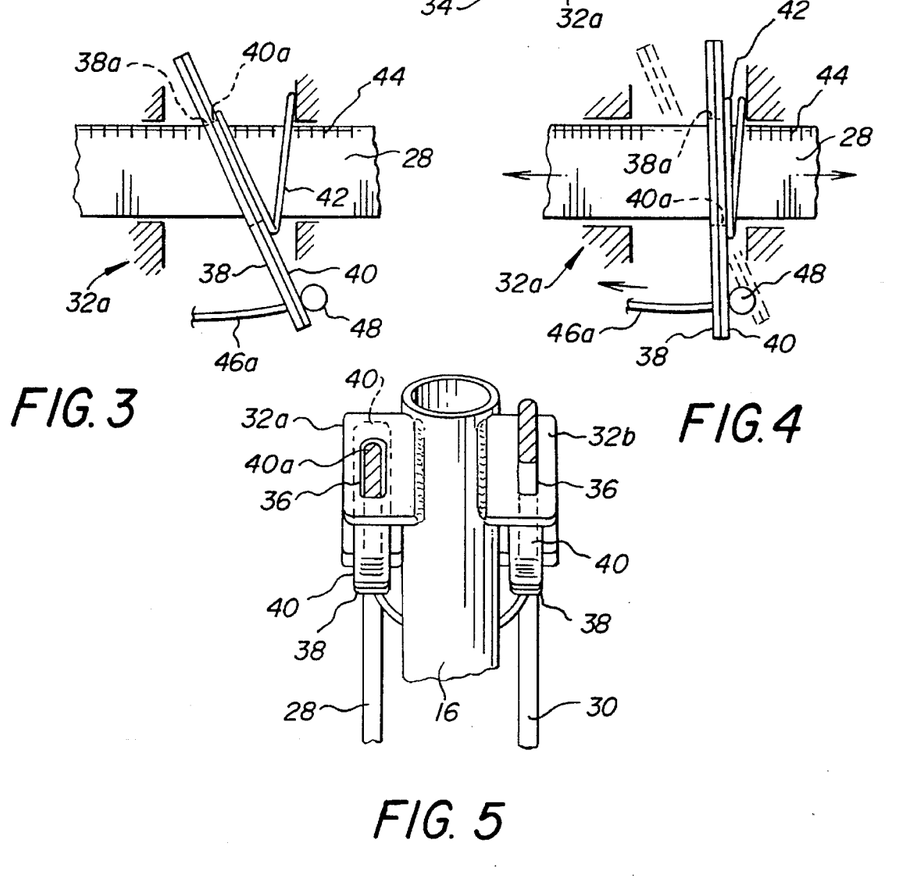
FIGS. 3 and 4 are simplified cross section views of a detail of the braking mechanism of the assembly of FIG. 1, illustrating the braked and released positions, respectively.
FIG. 5 is a transverse cross sectional view of a detail of the assembly of FIG. 1, taken generally along line V—V of FIG. 1.

As is shown in FIGS. 3 and 4, a generally V-shaped spring 42 normally biases plates 38 and 40 (and in particular, plate 38) against the upper surface of the corresponding seat arm 28 (or 30). The upper surfaces of arms 38 and 40 are knurled or ruled as indicated at 44 so that the plates 38 and 40 firmly and positively engage the corresponding seat arm 28 (or 30) and thus prevent movement thereof.

Pivoting of brake plates 38 and 40 is controlled by a control cable connection 46 which includes cable branches 46a and 46b connected to the plate pairs for the two housing parts 32a and 32b. As shown in FIGS. 3 and 4 for cable branch 46a, the cable branches each extend through the bottoms of plates 38 and 40 and terminate in a retaining element or stop 48 on the opposite side thereof so that pulling on branch cable 46a in the direction of the arrow at the bottom of FIG. 4 will cause the brake plates 38 and 40 to pivot to the upright, released position shown in FIG. 4. In this position, spring 42 is compressed and plates 38 and 40 are out of engagement with the corresponding seat arm 28 (or 30). With brake plates 38 and 40 in this released position, the corresponding arm 28 (or 30) is free to move in either direction as indicated by the oppositely directed arrows in the middle of FIG. 4. A common cable connection 46c is connected back to the handle bars (not shown) of the bicycle so that braking of the seat arms 28 and 30 can be controlled from there. It will, of course, be appreciated that the two brake plate pairs are controlled simultaneously and the arms 28 and 30 move together to provide movement of seat 12.

It is to be understood that the braking mechanism described above is conventional per se, i.e., similar mechanisms are used, for example, in sliding bar clamps to adjust, and to then set, the position of the clamping element. Such a clamp is made by KC Professional, Woodridge, N.J. (Model No. 94612). It will also be understood that other braking or locking mechanisms can be used.

As shown in FIG. 1 (and also in FIGS. 6 and 7) each housing part 32a and 32b is connected by a conventional helical steel spring 50 to a point defined by a set screw 52 along the side of the corresponding arms 28 and 30. The upper ends of the springs 50 are connected to the corresponding housing parts 32a and 32b by respective set screws 54.

It will be appreciated the exact "lumbar" position is a function of the overall configuration of the bicycle (e.g., the location of the handle bars and pedals) with respect to the physical characteristics of the rider (and, in particular, the lengths of the arms, legs and torso of the rider). Thus, the upward, rearward "lumbar" position of seat 12 can be adjusted to accommodate the individual using the bicycle and a mark or stop (not shown) can be provided to ensure that the seat 12 is returned to that position.

Figures 6, 7:
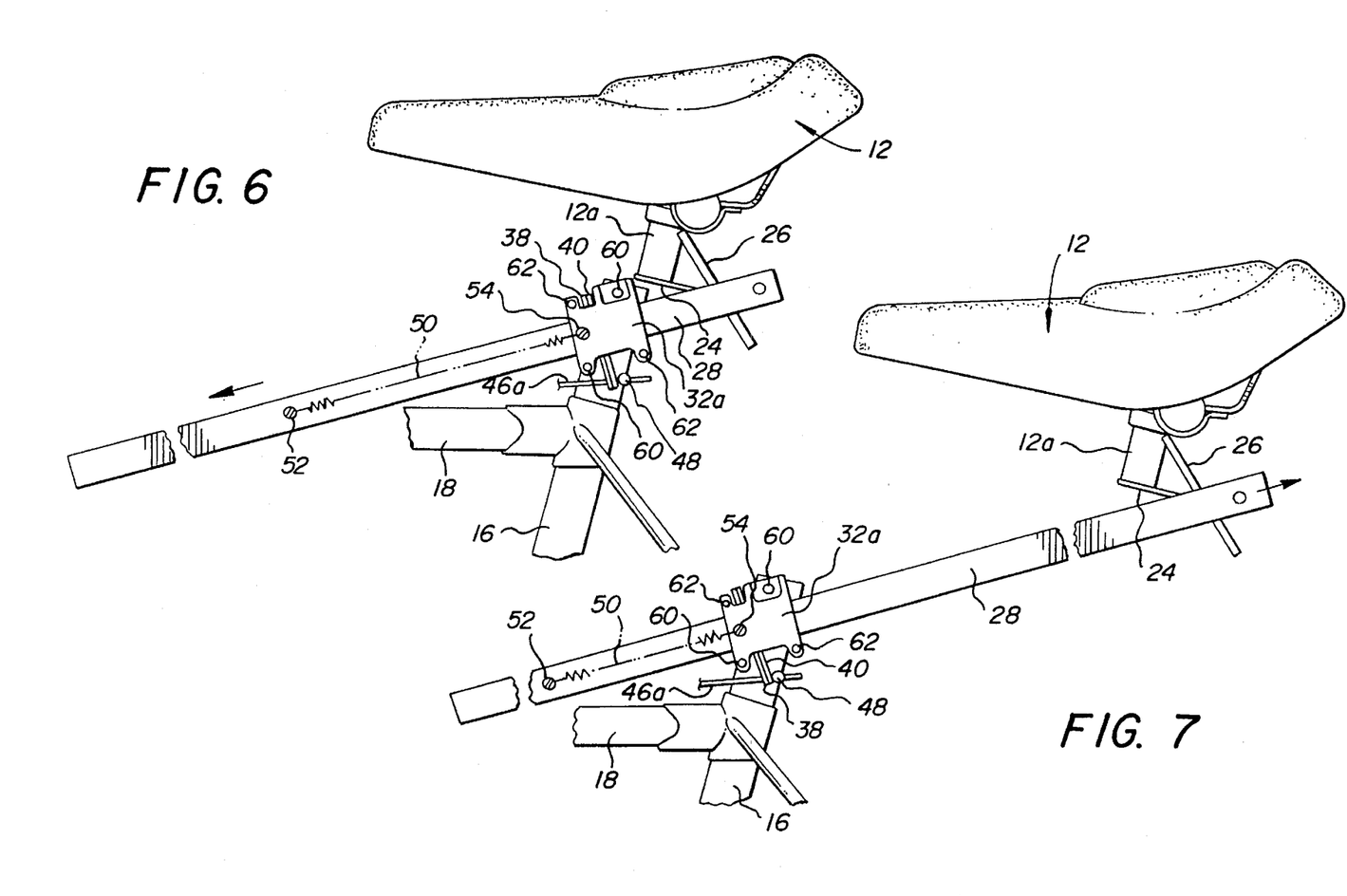
FIGS. 6 and 7 are side elevation views, similar to that of FIG. 1 but drawn to a reduced scale, illustrating movement of the bicycle seat between the normal and lumbar positions.

In accordance with an alternative embodiment illustrated in FIGS. 6 and 7, the angle of the seat 12 is adjustable by adjusting the angle at which the braking mechanism housing 32 is mounted on post 16. In other words, rather than directly welding the housing parts 32a and 32b to the post 16, an adjustable mounting is provided which permits the angle of the seat 12 to be adjusted to any angle from 0° to about 50° upwardly from the plane of the seat support post 16. In FIGS. 6 and 7, this is accomplished by screws 62 which expand through post 16 and bolts 60 which, in cooperation with screws 62, join the housing parts 32a and 32b together. The positions of screws 60 relative to post 16 determine the angle of the seat 16 while the screws 60 and bolts 62 clamp the housing parts 32a and 32b together around post 16. It will, of course, be appreciated that pivoting mechanisms of various conventional kinds can be used to achieve the same result, i.e., that of enabling the angle of seat 12 to be varied.

The overall operation of the seat adjustment unit of the invention can perhaps be best understood from a general consideration of FIGS. 6 and 7. With the brake mechanism described above in the released state or position, the arms 28 and 30, and thus seat 12 mounted thereon, can be moved downwardly as shown in FIG. 6 or upwardly as shown in FIG. 7. In the specific exemplary embodiment under consideration, in the normal position of seat 12, platform member 24 rests on the top of support post 16, i.e., in a position just to left and down from the position shown in FIG. 6. Assuming that the seat 12 is initially in the "lumbar" position indicated in FIG. 7, i.e., a position to the rear and up from the "normal" position, deactivation or release of brake plates 38 and 40 will permit the cyclist to use the effect of gravity to move the seat 12 from the lumbar position to the normal seat position. When this is done, the steel springs 50 associated with the seat arms or bars 28 and 30 are stretched. Thus, when it is desired to move the seat 12 from the normal position to the lumbar position, the brake plates 38, 40 are released by the rider, and the springs 50 are freed from this stretched condition and thus can return to the normal, unstretched length thereof as illustrated in FIG. 7. In doing so, springs 50 cause the seat arms 38 and 40 carrying seat 12 to move in the direction indicated, i.e., upwardly and rearwardly, so as to move the seat 12 to lumbar position thereof.

It will, of course, be appreciated that other mechanical constructions can be used to enable movement of a bicycle seat between the normal and lumbar positions described. For example, in a highly simplified construction, a rearwardly extended seat mount can be provided and a removable nut and bolt used to affix the seat in different positions by, e.g., engaging a seat bolt in one of a series of longitudinally spaced transverse holes provided along the extended mount. Further, a single arm or parallel arms similar to those described above can be provided as part of a sliding mount for the seat, and suitable locking means (e.g., a simple bolt or the like) can be used to secure the seat in the desired position. This locking means can be remotely releasable (e.g., by using a releasable spring loaded detent controlled by a control cable), and other forms of braking or locking mechanisms can be used which are released manually by the rider at the location of the seat or remotely (again using control cables or the like). However, the advantages of the automatic remotely operated braking mechanism described above are self-evident.

Figure 8:
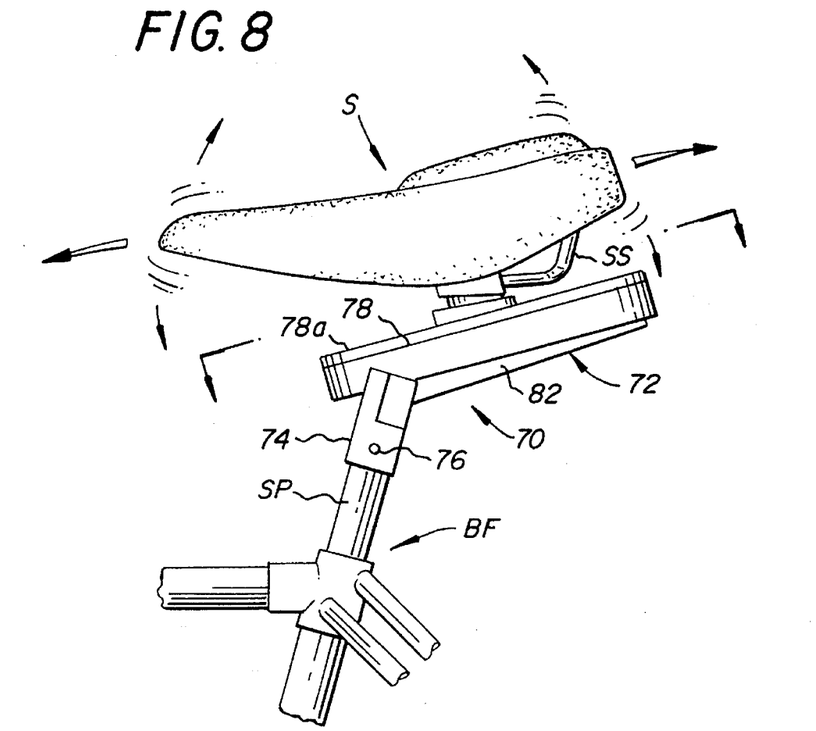
FIG. 8 is a side elevational view of an adjustable bicycle seat assembly constructed in accordance with a further preferred embodiment of the invention.

Referring to FIGS. 8 to 12, a further, preferred embodiment of the invention is illustrated. Referring first to FIG. 8, a seat S is shown mounted on a portion of a bicycle frame denoted BF by an adjustable seat support construction 70. The support construction 70 includes a mount 72 including a downwardly depending cylindrical portion 74 which fits over the seat support post SP of the bicycle frame BF and is releasably affixed thereto by suitable means such as a set screw 76. Of course, other suitable techniques can also be used to affix support portion 74 of seat construction 70 to support post SP.

Figures 9, 11:
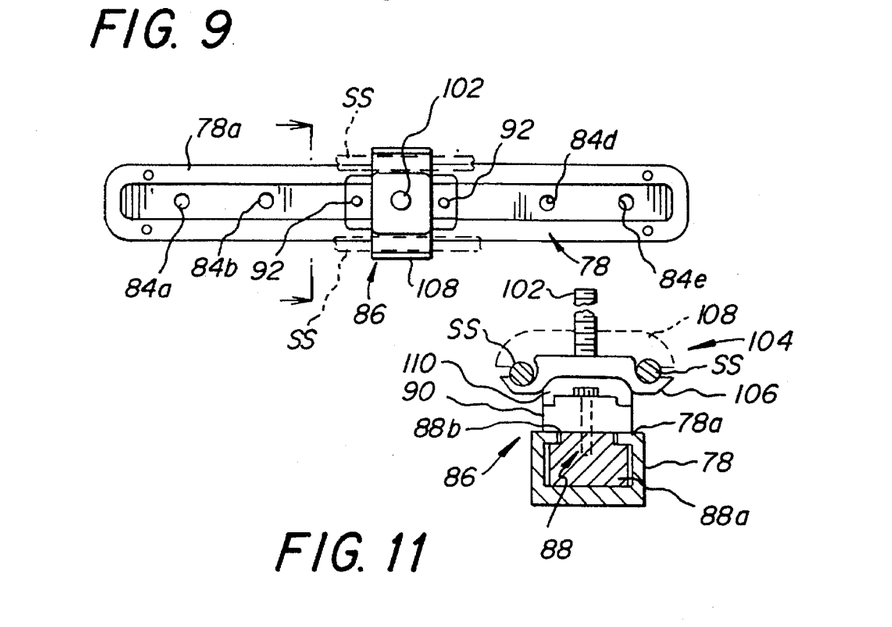
FIG. 9 is a cross sectional view of the assembly of FIG. 8 taken generally along line IX—IX of FIG. 8.
FIG. 11 is a transverse cross section taken generally along line XI—XI of FIG. 9.
Figure 10:
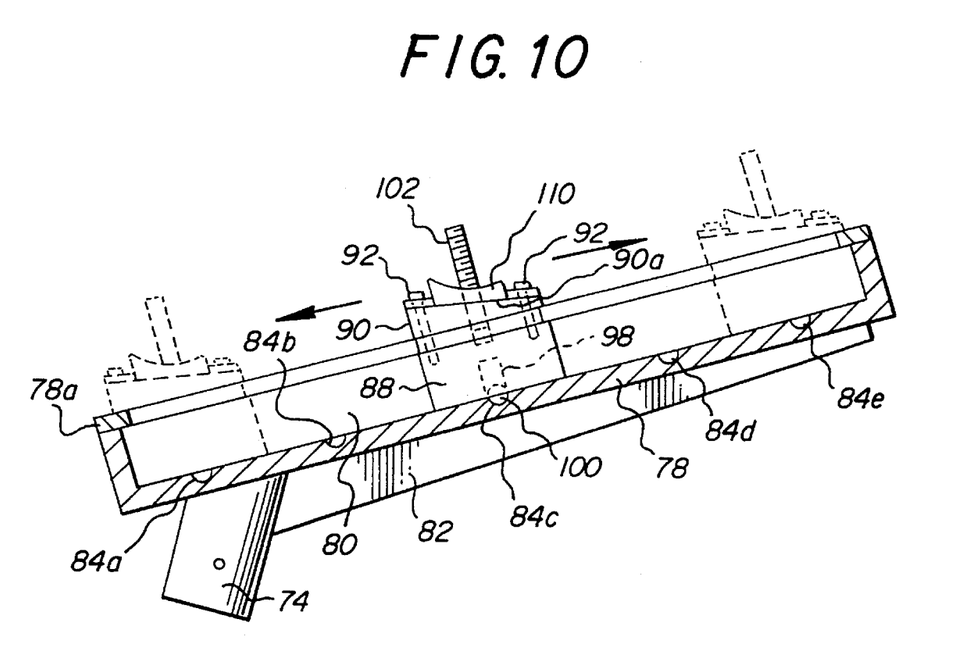
FIG. 10 is a longitudinal cross sectional view of the mount or support member of FIG. 8, with the seat removed, illustrating the movement of the base element of the seat support arrangement.

The mount 72 further includes an elongate body portion 78 in the general shape of a parallelepiped and having, as shown in FIGS. 9 and 10, a generally upwardly facing, longitudinally extending slot 80 formed therein which extends substantially the full length of the body portion 78. A longitudinal reinforcement element or rib 82 provides strengthening of the body portion 78. As shown in FIGS. 8 and 10, the inner surface of the bottom slot-defining wall of body portion 78 includes formed therein five serially disposed, equally spaced hemispherical recesses 84a, 84b, 84c, 84d, 84e which define the five positions into which the seat support assembly 70 can be moved in this particular embodiment.

A seat support slide assembly 86 affixed to seat S is supported by mount 72 and includes a base member or slide block 88 which is received in slot 80 and adapted to move therealong between the five positions referred to above. To this end, as is shown in FIG. 11, the cross section of slide block 88 is shaped to conform to that of the cross section of slot 80 and, in the illustrated example, the slide block 88 includes a lower rectangular base portion 88a and an upper rectangular neck portion 88b formed integrally therewith. In a preferred embodiment, the body portion 78 of mount 72 includes an upper or top plate 78a which extends inwardly around the peripheral edges of the slot or cavity 80 so that side block 88 is captured and confined with slot 80 while being movable therealong.

As is perhaps best seen in FIG. 10, a seat interface member 90 is secured to the upper surface of slide block 88 by a pair of screws or bolts 92 or other suitable means. Seat interface member 90 includes an upper inclined surface 90a which accommodates, i.e., compensates for, the incline of mount 72 and thus enables seat S to be mounted generally parallel to the ground.

Figure 12:
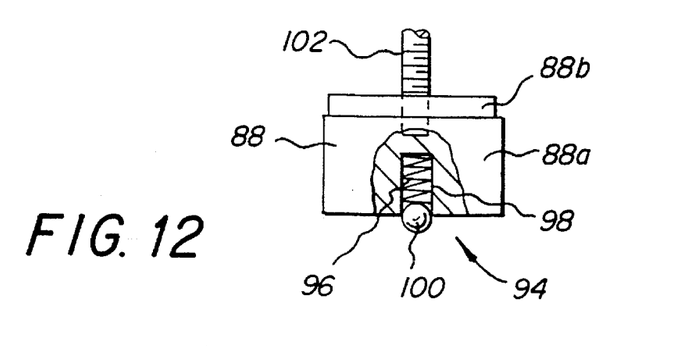
FIG. 12 is detail of the base element of the adjustable assembly of FIG. 8, broken away to show the biassing spring and ball bearing detent.

As shown in FIGS. 10 and 12, slide block 88 includes a spring loaded detent arrangement 94 including a spring 96 received in a hole 98 in block 88 and a detent member or ball bearing 100 which is adapted to be received in the recesses 84a, 84b, 84c, 84d, 84e, of body portion 78. The position of ball bearing 100 is centered in bore 98, and the spring force of spring 96 is such that a forward or backward thrust by the rider causes compression of the spring 96 and thus allows release of ball bearing 100 and consequent movement of the seat S to a new position.

As shown in FIGS. 9 to 12, slide block 88 includes, threaded therein, a bolt 102 which is used to anchor the seat S. Bolt 102 extends through a clam shell mounting assembly or clamp 104, best seen in FIGS. 9 and 11 and including a lower clamping element 106 and an upper clamping element 108. As shown, parallel extending support springs SS of seat S such as are found on conventional bicycle seats are clamped between elements 104 and 106 so as to secure seat S in place. A further, specially shaped interface member 110, perhaps best seen in FIG. 10, is mounted on the upper surface 90a of seat interface member 90 and is shaped to accommodate the curved lower surface of lower clamp 106. Clamping arrangement 104 enables tilting adjustment of seat S as indicated in dashed lines in FIG. 8.

The mounting arrangement of FIG. 8 to 12 can be constructed such that the seat S can be moved up and back at an angle between 0° and 60°, i.e., the angle of incline of body portion 78 of mount 70 can be made to be any angle between these angles. Further, the amount of travel of the seat S can be designed to be anywhere from one inch up to 8 inches. In general, the construction of FIGS. 8 to 12 provides the same advantages as those described previously in connection with other embodiments while being less complex in construction.

It should also be noted that although the invention has been described with respect to a bicycle, the invention is also applicable to a stationary cycling device, a unicycle and the like.

Although the present invention has been described relative to specific exemplary embodiments thereof, it will be understood by those skilled in the art that other variations and modifications can be effected in these exemplary embodiments without departing from the scope and spirit of the invention.

What is claimed is:

1. An adjustable seat post construction for a cycling device comprising:

a movable seat assembly including a seat for a rider of the cycling device; and a mounting means for supporting said seat on the cycling device and for providing movement of said seat along a path defined by said mounting means between a first, normal position and at least a further position located upwardly and rearwardly of said first position, said seat assembly including a base member affixed to the seat and said mounting means including an elongate body member having a longitudinal axis and including an elongate slot therein extending along said longitudinal axis in which said base member of the seat assembly is received, said slot, in use of the seat post construction on the cycling device, being oriented so as to enable said seat, in use, to slide along said body member between said first position and said at least one further position along a path parallel to said longitudinal axis and forming an acute angle with a horizontal axis.

2. A seat post construction as claimed in claim 1, wherein said body member, in use of the cycling device including a frame including a support post, extending upwardly and rearwardly from said support post, and the longitudinal axis of said slot extends at an acute angle with respect to the horizontal axis.

3. A seat post construction as claimed in claim 1 wherein said seat includes a pair of support springs and said seat assembly includes clamping means for clamping the assembly to the support springs of the seat, said clamping means including a pair of curved plates secured together to form a clam shell construction.

4. A seat post construction as claimed in claim 1 wherein said body member includes an upper portion extending inwardly on at least two sides of the slot and said base member comprises a sliding block captured within said slot by the inwardly extending upper portion.

5. A seat post construction as claimed in claim 1 wherein said base member comprises a first, block portion received in said slot and an external portion affixed to said first, block portion and having an inclined upper surface.

6. A seat post construction as claimed in claim 1 wherein said at least one further seat position comprises four further seat positions.

7. A cycling device including an adjustable seat construction, said seat construction comprising:

a movable seat assembly including a seat for a rider of the cycling device; and a mounting means for supporting said seat on the cycling device and for providing movement of said seat along a path defined by said mounting means between a first, normal position and at least a further position located upwardly and rearwardly of said first position, said seat assembly including a base member affixed to the seat and said mounting means including an elongate body member having a longitudinal axis and including an elongate slot therein extending along said longitudinal axis in which said base member of the seat assembly is received, said slot being oriented with respect to the cycling device so as to enable said seat, in use, to slide along said body member between said first seat position and said at least one further seat position along a path parallel to said longitudinal axis and forming an acute angle with a horizontal axis.

8. A cycling device as claimed in claim 7, wherein said cycling device includes a frame including a support post and wherein said body member extends upwardly and rearwardly from said support post, and wherein the longitudinal axis of said elongate slot extends at an acute angle with respect to the horizontal axis.

9. A cycling device as claimed in claim 7 wherein said seat includes a pair of support springs and said seat assembly includes clamping means for clamping the assembly to the support springs of the seat, said clamping means including a pair of curved plates secured together to form a clam shell construction.

10. A cycling device as claimed in claim 7 wherein said body member includes an upper portion extending inwardly on at least two sides of the slot and said base member comprises a sliding block captured within said slot by said inwardly extending upper portion.

11. A cycling device as claimed in claim 7 wherein said body member is inclined at an acute angle with respect to the horizontal axis and said base member comprises a first, block portion received in said slot and an external portion affixed to said first, block portion and having an inclined upper surface.

12. A cycling device as claimed in claim 7 wherein said base member includes a central anchoring post and clamping means mounted on said anchoring post for clamping said base member to the seat.

13. A cycling device as claimed in claim 7 wherein said at least one further seat position comprises four further seat positions.

14. An adjustable seat post construction for a cycling device comprising:

a movable seat assembly including a seat for a rider of the cycling device; and a mounting means for supporting said seat on the cycling device and for providing movement of said seat along a path defined by said mounting means between a first, normal position and at least a further position located upwardly and rearwardly of said first position, said seat assembly including a base member affixed to the seat and said mounting means including a body member having an elongate slot therein in which said base member of the seat assembly is received, said slot, in use of the seat post construction on the cycling device, being oriented so as to enable said seat to slide with a substantial horizontal component of sliding movement along said body member between said first position and said at least one further position, said construction further comprising releasable means, releasable by the rider, without manual intervention and without dismounting, when the rider is riding the cycling device to which the seat post construction is, in use, secured, for releasably fixing said seat in each of said first position and said at least one further position.

15. A seat post construction as claimed in claim 14 wherein said releasable means comprises spring biased detent means.

16. A seat post construction as claimed in claim 14 wherein said slot is defined by a bottom wall and side walls of said body member, and wherein said releasable means includes a spring loaded ball bearing received in the base member of the seat assembly, and a plurality of recesses formed in said bottom wall of the body member at locations corresponding to said first and said at least one further seat positions.

17. A cycling device including an adjustable seat construction, said seat construction comprising:

a movable seat assembly including a seat for a rider of the cycling device; and a mounting means for supporting said seat on the cycling device and for providing movement of said seat along a path defined by said mounting means between a first, normal position and at least a further position located upwardly and rearwardly of said first position, said seat assembly including a base member affixed to the seat and said mounting means including a body member having an elongate slot therein in which said base member of the seat assembly is received, said slot being oriented with respect to the cycling device so as to enable said seat to slide with a sliding movement having a substantial horizontal component along said body member between said first seat position and said at least one further seat position, said cycling device further comprising releasable means, releasable by the rider, without manual intervention and without dismounting, while riding on the cycling device, for releasably fixing said seat in each of said seat positions.

18. A cycling device as claimed in claim 17 wherein said releasable means comprises spring biased detent means.

19. A cycling device as claimed in claim 17 wherein said slot is defined by a bottom wall and side walls of said body member, and wherein said releasable means includes a spring loaded ball bearing received in the base member of said seat assembly, and a plurality of recesses formed in said bottom wall at locations corresponding to said seat positions.

20. An adjustable seat post construction for a cycling device comprising:

a movable seat assembly including a seat for a rider of the cycling device; and a mounting means for supporting said seat on the cycling device and for providing movement of said seat along a path defined by said mounting means between a first, normal position and at least a further position located upwardly and rearwardly of said first position, said seat assembly including a base member affixed to the seat and said mounting means including a body member having an elongate slot therein in which said base member of the seat assembly is received, said slot, in use of the seat post construction on the cycling device, being oriented so as to enable said seat to slide with a substantial horizontal component of sliding movement along said body member between said first position and said at least one further position, said base member including a central anchoring post and clamping means mounted on said anchoring post for clamping said base member to the seat.

21. A cycling device having a front end toward which a rider of the cycling device faces and including an adjustable seat assembly, said seat assembly comprising:

a seat for the rider of the cycling device;

a seat mounting post; and adjustable mounting means for mounting said seat on said seat mounting post of said cycling device and for providing movement in a direction along a path forming an acute angle with a horizontal axis of said seat between a first, normal riding position on said cycling device wherein said seat is substantially directly above the seat mounting post and at least part of said seat is disposed rearwardly of the seat mounting post and a second position on the cycling device spaced from and located upwardly and rearwardly of said first position in said direction wherein the lumbar spine of rider rider sitting on said seat passively assumes a protective curvature, said mounting means further comprising clam-shell mounting means for adjusting the angle of the seat relative to the seat mounting post.

* * * * *